(No Model.) 2 Sheets—Sheet 1.

N. NILSON.
PIPE COUPLING FOR RAILWAY CARS.

No. 420,209. Patented Jan. 28, 1890.

Witnesses.
S. J. Beardsley
J. Jessen

Inventor.
Nils Nilson
By Paul, Sanford & Merwin attys.

(No Model.) 2 Sheets—Sheet 2.

N. NILSON.
PIPE COUPLING FOR RAILWAY CARS.

No. 420,209. Patented Jan. 28, 1890.

Witnesses
S. J. Beardsley
J. Jessen.

Inventor
Nils Nilson.
By Paul, Sanford & Merwin att'ys

UNITED STATES PATENT OFFICE.

NILS NILSON, OF MINNEAPOLIS, ASSIGNOR TO THE NORTHWESTERN MODERN CAR HEATING AND LIGHTING COMPANY, OF ST. PAUL, MINNESOTA.

PIPE-COUPLING FOR RAILWAY-CARS.

SPECIFICATION forming part of Letters Patent No. 420,209, dated January 28, 1890.

Application filed December 27, 1887. Serial No. 259,006. (No model.)

*To all whom it may concern:*

Be it known that I, NILS NILSON, of Minneapolis, in the county of Hennepin and State of Minnesota, have invented certain new and useful Improvements in Pipe-Couplings for Railway-Cars, of which the following is a specification.

My invention relates to the arrangement of the pipes between the cars of a railway-train, whereby I am enabled to allow for any ordinary variation in the relative position of the cars and maintain a continuous pipe and one from which any condensation which may take place at this point will be carried off through the pipe by gravity and all liability of freezing be avoided.

Another object of my invention is to provide a device whereby the two sections of the pipe will automatically be detached without bringing any undue strain upon the pipe if the cars should be accidentally uncoupled.

My invention consists, generally, in the construction and arrangement hereinafter described, and particularly pointed out in the claims.

Figure 1:
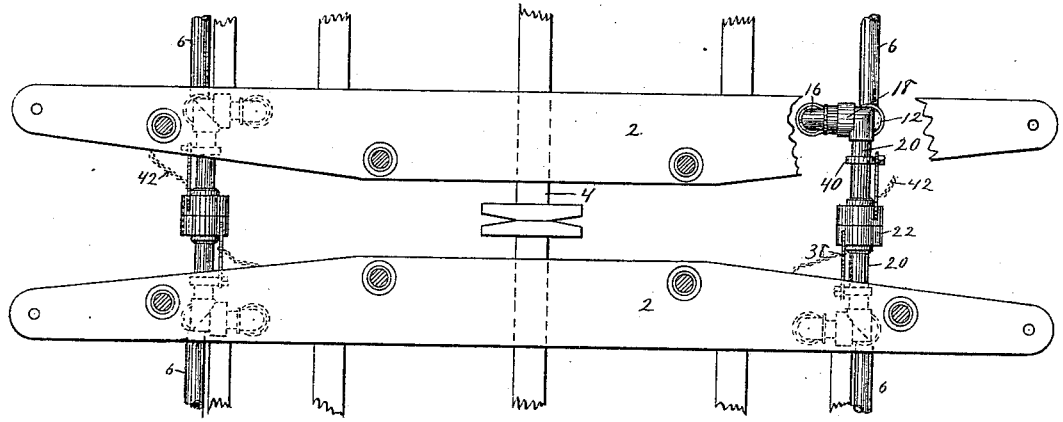
Figure 2:
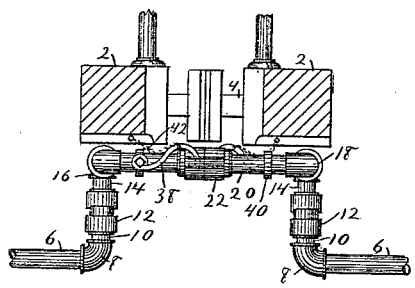
Figure 3:
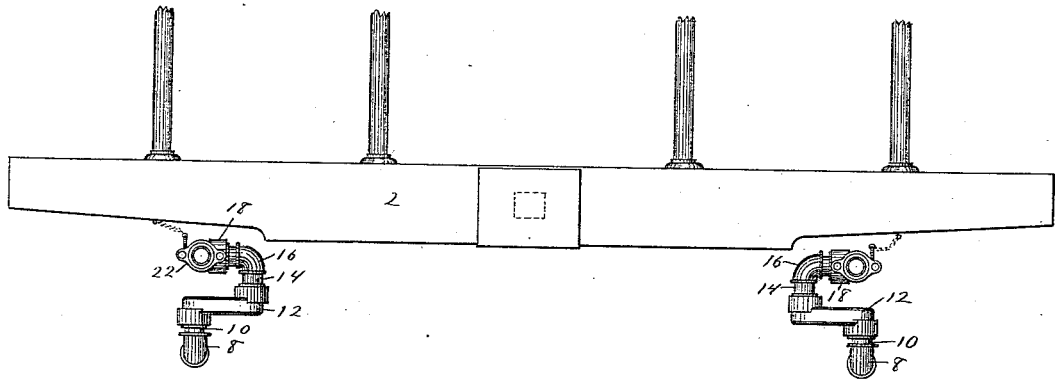
Figure 4:
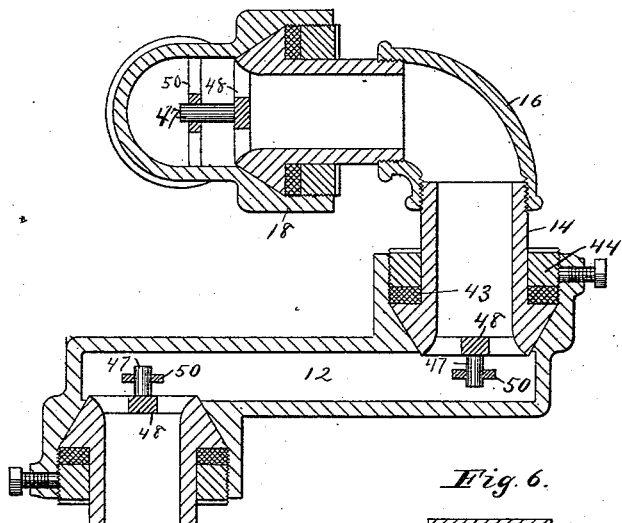
Figure 6:
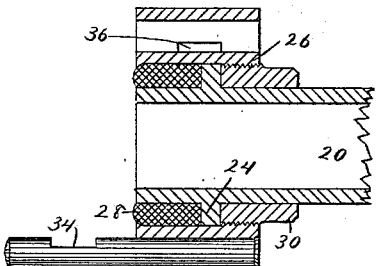
Figure 5:
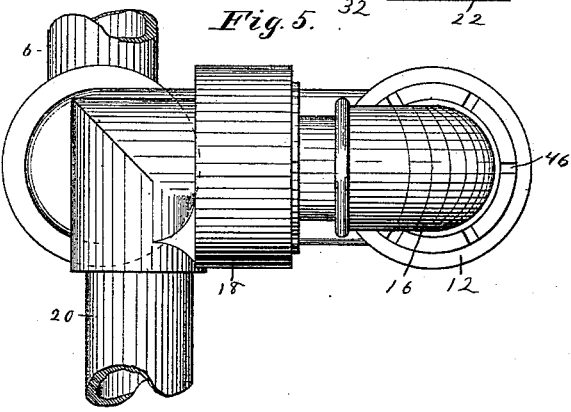

In the drawings which form a part of this specification, Figure 1 is a plan view of a portion of two cars with my improvement attached thereto. Fig. 2 is a side elevation. Fig. 3 is an end elevation. Fig. 4 is a vertical section of a portion of my improved coupling on an enlarged scale. Fig. 5 is a plan view of the same; and Fig. 6 is a detail.

In the drawings, 2 represents the end sills or bumpers of the cars, which are provided with suitable buffers and draw-bars 4.

Steam or air pipes 6 extend under each of the cars. Each of these pipes is provided with an elbow 8, into which a thimble or sleeve 10 is secured. This thimble extends into one end of the horizontal arm 12, which lies above the elbow and preferably extends inward toward the center of the car.

A swivel-joint is made between the sleeve 10 and arm 12, the construction of which will be hereinafter more fully described. The opposite end of the arm 12 is also provided with swivel-joint and sleeve 14, substantially similar to the sleeve 10. The sleeve 14 is secured to an elbow 16, preferably turning outward, and is attached to a third swivel-coupling 18, which lies longitudinally of the car. The opposite end of the coupling is screw-threaded and receives the pipe 20, which terminates in the face-coupling 22. This coupling is made in two sections, substantially similar to each other, one section attached to the extremity of the pipe 20 under one car and the other section to a similar pipe under the other car.

It will be seen that the swivel-couplings on the horizontal arm 12 allow for the movement of the cars forward and back in a horizontal direction, which would occur when passing a curve, and the longitudinally-placed swivel 18 allows for a vertical movement caused by the unevenness of the track and by the independent action of the springs under each car, so that when the face-couplings 22 are held together the connection of the pipe is complete between the two cars and the pipe 20 is sufficiently raised above the main pipe to allow any water collecting therein to flow back through the couplings into the main pipe, where it can be tapped off. The pipes between the cars will thus remain free and the liability of freezing will be avoided.

The face-couplings 22 are preferably constructed as shown in Fig. 6. A collar 24 is secured to the pipe 20 at a suitable distance from its extremity. This collar fits into an opening in the hub 26, which is bored to receive it. A ring 28, formed of suitable elastic packing, is placed within the recess formed between the hub 26 and the pipe 20, forward of the collar 24. At the opposite side and bearing against the collar I prefer to place a thimble 30, which fits closely to the pipe 20. The outer circumference of this thimble is screw-threaded and fits a correspondingly screw-threaded opening in the hub 26, and by turning the said thimble in the screw-threaded opening the hub 26 will be drawn backward in the direction of the length of the pipe, for the reason that the thimble bears against the collar 24, which prevents the thimble from advancing on the pipe, and the hub being free will be forced back. This operation will force the packing-ring 28 out from the face of the hub, and coming in contact with the similar ring in the other portion of the coupling will form a tight joint. It will be seen that the pipe 20 is held to the coupling by the collar 24 upon the said pipe being clamped between the packing-ring 28 and the thimble 30, but is free to turn in the hub if the motion of the cars should cause a movement of the pipe in this direction and relieve the pipes from any strain.

I prefer to provide a pin 32 in each section of the hub 26 at opposite sides of the pipe 20. This pin is provided with a recess 34, cut in its inner circumference. A slot 36 is cut in the hub 26 at a point to correspond with the recess 34 in the pin 32 when the two sections are coupled together.

A hook-shaped key 38 is pivoted to the collar 40 on the pipe 20 and enters the slot 36 in the hub. When the two sections of the coupling are in position, the pin 32, secured to one section, will enter the corresponding hole in the other section until the recess 34 is in line with the slot 36. The key 38 can now be forced down and hold the said pin firmly in this position. The end of the key which bears against the pin may be made slightly tapered, so that by forcing it down the two sections of the coupling are drawn together and the rubber ring compressed.

I prefer to provide a device for automatically separating the two sections of the coupling in case the cars should be accidentally detached or uncoupled. A chain 42 is provided for each section of the coupling, one end of which is secured to the pivoted key 38 and the opposite end to the bumper 4. These chains are made sufficiently strong to allow for the ordinary vibration of the swinging and swiveling couplings; but the slack in this chain will be taken up before the horizontal arm 12 is straightened. Should the cars become accidentally uncoupled the slack of the chain will be first taken up and then tension is brought between the bumper and the pivoted key, which causes the key to be raised out of the slot in the hub and release the pin 32, which is then free to slide out of this section of the coupling. Both chains being of substantially the same length the two sections will be released at the same time and no strain will be brought to bear upon any portion of the pipe or couplings.

I prefer to construct the swivel-coupling as follows: As all these couplings are substantially alike, it will only be necessary to give a description of one to understand the construction and operation of all. I select the one in which the sleeve 14 attaches to the upper portion of the arms 2. The opening in the arm 12 is screw-threaded at its upper extremity and the lower portion is made conical or cup-shaped and receives the end of the sleeve 14, which is enlarged to fit the cup-shaped opening in the said arm. The sleeve and coupling are preferably ground together to make a steam-tight joint, and an elastic packing-ring 43 is placed above the shoulder formed by the enlarged end on the sleeve. A screw-threaded collar 44 is inserted in the screw-threaded opening in the arm. This collar is provided with suitable notches 46, for the reception of a spanner-wrench by which the collar is turned down to bring it to a bearing upon the packing-ring 43. The interior of the sleeve is formed slightly bell-shaped to more completely free the pipes from water. A center pin 47 is preferably secured to the sleeve 14, and may be secured thereto by suitable ribs 48, forming a spider at the extremity of the said sleeve, to locate the said pin at the center of the opening. The center pin projects beyond the end of the sleeve and is turned and fitted to suit a corresponding opening in a bar 50, attached to the arm 12. The center pin is for the purpose of sustaining a portion of the weight of the swivel-coupling and to relieve the flexible washer or packing 43, and to hold the sleeve upon its seat in the arm 12.

I claim as my invention—

1. The combination, with the pipes 6 of railway-cars, of the swinging sections pivoted thereto, the face-couplings 22, provided with openings 36, the pins 32 fitting in said openings and having slots 34, the pivoted keys 38 engaging said pins, and the chains 42, all arranged substantially as described.

2. The pipe-section provided with the conical or cup-shaped opening, and the bar 50 extending across said opening, the sleeve having a conical end fitting said opening, the cross-bars 48, and the pin 47, fitting an opening in said bar 50, substantially as described.

In testimony whereof I have hereunto set my hand this 14th day of December, 1887.

NILS NILSON.

In presence of—
R. H. SANFORD,
A. M. GASKELL.